(No Model.) 2 Sheets—Sheet 1.
L. WELKER.
MEANS FOR SUPPLYING FOOD AND AIR TO ENTOMBED MINERS.
No. 593,259. Patented Nov. 9, 1897.
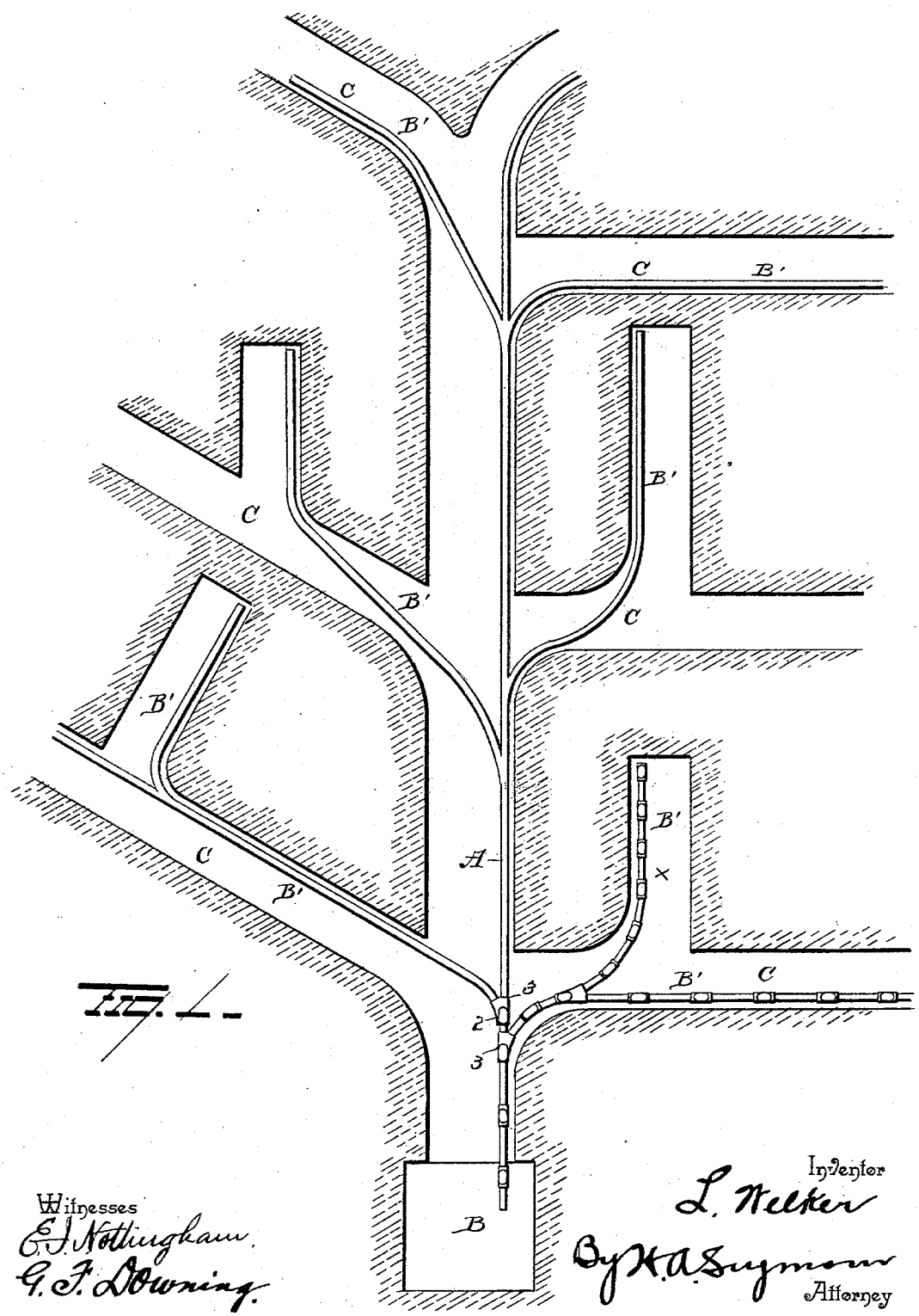
Witnesses
E. J. Nottingham.
G. F. Downing.
Inventor
L. Welker
By H. A. Seymour
Attorney

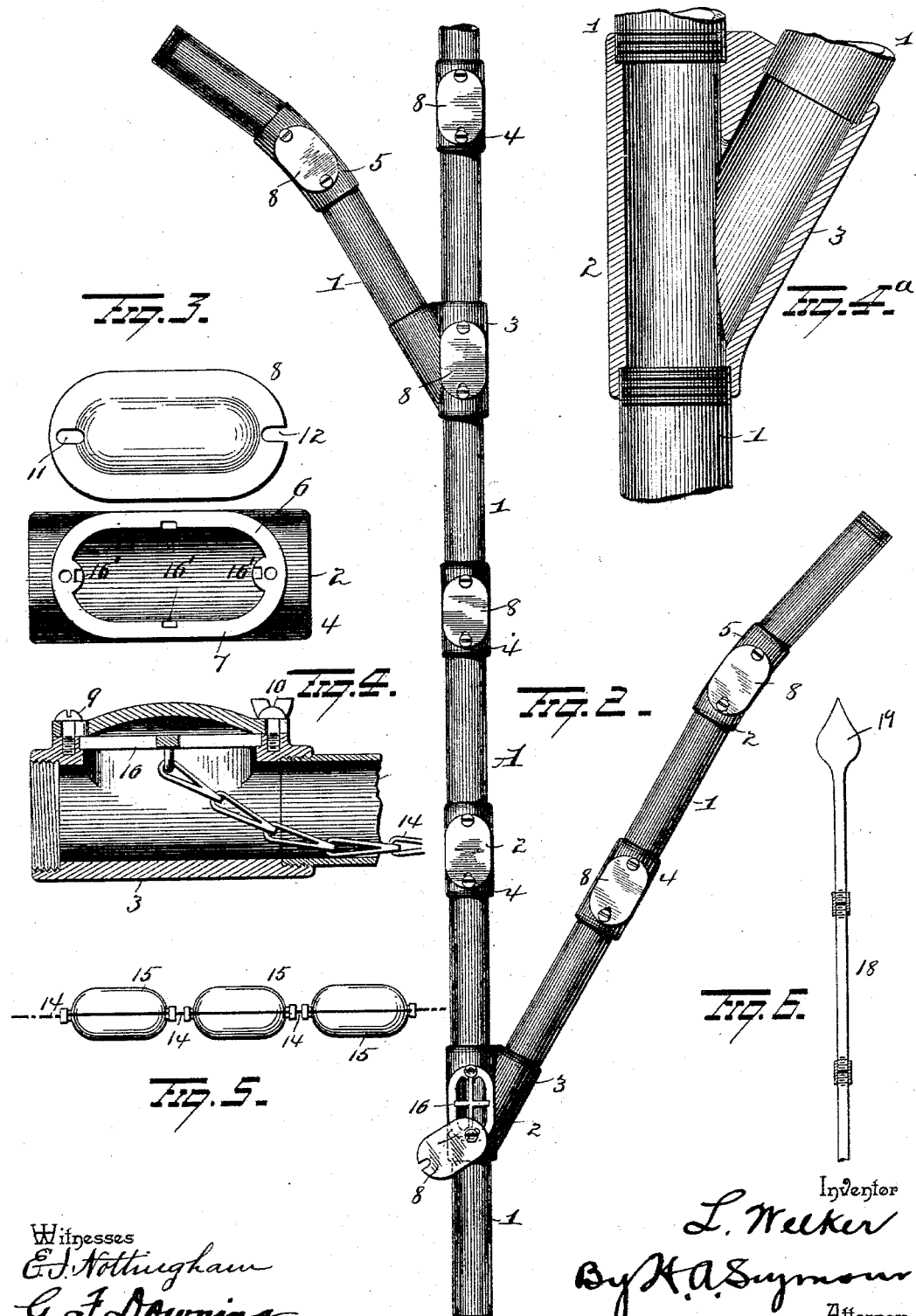

UNITED STATES PATENT OFFICE.

LOUIS WELKER, OF WILLIAMSPORT, PENNSYLVANIA.

MEANS FOR SUPPLYING FOOD AND AIR TO ENTOMBED MINERS.

SPECIFICATION forming part of Letters Patent No. 593,259, dated November 9, 1897.

Application filed February 1, 1897. Serial No. 621,511. (No model.)

*To all whom it may concern:*

Be it known that I, LOUIS WELKER, a resident of Williamsport, in the county of Lycoming and State of Pennsylvania, have invented certain new and useful Improvements in Means for Supplying Food and Air to Entombed Miners; and I do hereby declare the following to be a full, clear, and exact description of the invention, such as will enable others skilled in the art to which it appertains to make and use the same.

My invention relates to an improvement in means for supplying food and air to entombed miners; and it consists in a main conduit extending from the main shaft of the mine or from a point outside of the mine through the main heading or drift and branch conduits leading from this main conduit through the branch headings or drifts, the conduits being provided at intervals, regular or otherwise, with chambers having removable covers, and means for conveying food and water through said pipe from one side of a "cave-in" to the other.

My invention further consists in the system and in the parts and combination of parts employed in connection with said system, as will be more fully described, and pointed out in the claims.

In the accompanying drawings, Figure 1 is a diagrammatic representation of a mine, showing main and branch headings with my system of conduits therein. Fig. 2 is a view showing the main and branch conduits. Figs. 3, 4, and 4ᵃ are views of the couplings used. Fig. 5 is a view of the conveyer-chain, and Fig. 6 is a view of sectional conveyer-rod.

A represents a conduit composed, preferably, of sections of pipe 1 about four inches in diameter, the pipe-sections being connected by the couplings 2. These couplings are preferably of three varieties, one of which, 3, is designed for coupling a branch conduit to the main conduit or to a branch conduit, another, 4, which is for coupling the sections in a straight line, and the third variety, 5, for coupling up sections on a curve. All of these, however, are open at the top, as shown at 6, and are provided with flat seats 7, on which the covers 8 rest. These covers rest on the flat seats 7 and are secured thereon and packed by suitable packing, if necessary, by the screws 9 and 10. The screw or fastening 9 forms a pivot for the cover and is not intended to be removed, while the screw 10 is preferably a thumb-screw or is provided with a handle whereby it can be turned to release the cap or cover 8 without the use of any tools. The screw 9 passes through an elongated closed slot 11 in the cover, while the screw 10 passes through an open slot 12. Hence it will be seen that by loosening one screw 10 the cover can be moved longitudinally and then turned on pivot 9, thus giving free access to the interior of the coupling and pipes. The pipes and couplings are connected together by abutting joints, so that there are no edges or corners exposed which would retard or interfere with the free passage of the conveyer to be hereinafter described.

The main conduit A runs from the shaft B or from a point outside of the mine through the main heading, as shown in Fig. 1, and branch pipes B', connected to the main conduit by couplings 3, extend into each branch or drift C as they are formed, the couplings or hand-holes being located at intervals throughout the main and branch conduits. Pipes and couplings should be added as the work progresses, so that the miners wherever they may be caught by a cave-in can have access to the system.

Thus supposing a cave-in should occur in one of the branch headings at *x*, it will be seen that the workmen entombed can in the first place use the conduit as a speaking-tube and thus communicate with the workmen or rescuers on the other side of the cave-in. In addition to this the conduit can be used for forcing in a supply of fresh air to the men entombed.

In order to provide the men locked in by the falling earth or coal with food, water, or stimulants, I have provided a series of conveyers extending throughout the entire systems of conduits. Each conveyer consists, primarily, of a chain, cable, rope, or equivalent 14, carrying one or any number of receptacles 15, each of which is provided with a removable section or cover, the receptacles being preferably oblong with curved ends, so as to enable them to readily pass through the conduits. These receptacles can be made to contain the food or fluids or constructed to carry vessels containing same, but in any event the chains or cables carrying these receptacles, or to which the receptacles can be attached, normally rest in the conduits and extend out to the shaft or outside of the mine, so that no matter where the cave-in occurs communication can be had with the men locked in.

I prefer to provide the main conduit with a chain or cable extending throughout its length and each branch with a chain or cable extending throughout its length and through the main conduit, but the chains in the branches might stop at the connections with the main conduit and be hooked to such connection, thus leaving but a single chain passing through the main conduit. Hence it will be seen that if the cave-in should occur in the main heading communication could be had with the men through the main conduit, whereas if it should occur in a branch or drift the branch conduit would be used.

As an illustration, if the cave-in should occur at the point x the men entombed would most naturally seek to effect an escape through the fallen mass of coal or earth while the rescuers would attack the mass from the other side, and by removing the covers nearest the fallen mass communication can be had with the men entombed and food, water, and stimulants furnished them by the rescuers on the other side by simply moving the chain or cable back and forth from the one open handhole to the other.

It will be understood that it is not essential that the receptacles be permanently attached to the chains or cable, as they can be attached when needed, and when the branch chains extend only to the main conduit I prefer to attach the end to the main conduit by the X-shaped piece 16, which latter is of such shape as to prevent its entrance into the conduits and normally rests in seats 16', formed in the coupling immediately beneath the cap. With this arrangement it will be seen that when the cap is turned so as to expose the conduit the part 16 can be removed, but so long as it is attached to the chain the end cannot be pulled into the conduit. After the receptacles are attached to the chain and a length of chain added the part 16 can be removed, thus permitting the receptacles to be drawn into the conduit.

It is possible, however, that chains or cables used will break, and in order to provide for such an emergency or to provide a substitute for the chain or cable I propose to employ also the sectional rod 18. This is made of short sections of steel rod sufficiently small in diameter to enable it when the sections are coupled to bend so as to follow any curves in the conduit. These sections are provided at their ends with screw or other couplings whereby they can be united, and the end sections can be provided with a guiding-point or with a receptacle 19 or with means for fastening a rope or cable thereto. One set of these rods should be with each squad of miners and another outside of the mine, and a set when coupled up should be of a length sufficient to pass any ordinary cave-in. By means of this sectional rod food or stimulants can be passed to the men or drawn by the imprisoned men past the mass choking up the tunnel, or a rope or chain can be attached to the rod and passed by the mass to be used in conveying the food or stimulants.

The conduits are preferably located at one side of the drift at the bottom thereof out of the way, and if necessary the system of pipes can be used in the event water is encountered for carrying off the same.

It is evident that numerous slight changes might be made in the general form and arrangement of the several parts herein described without departing from the spirit and scope of my invention, and hence I would have it understood that I do not limit myself to the precise details shown; but, Having fully described my invention, what I claim as new, and desire to secure by Letters Patent, is—

1. The means herein described comprising a conduit or series of connected conduits leading from a mine or chamber each conduit having couplings provided with removable covers and a conveyer adapted to be operated through any portion of any one of said conduits, substantially as set forth.

2. The combination with a conduit comprising a series of pipes and interposed couplings or connections, the latter having removable covers, of a flexible conveyer permanently located within said conduit, substantially as set forth.

3. The combination with a conduit comprising a series of pipes and interposed couplings or connections the latter having removable covers, of a flexible conveyer permanently located within the conduit and receptacles attached to said conveyer.

4. The combination with a conduit comprising a series of pipes and interposed couplings and connections, removable covers pivotally attached to said couplings or connections and a screw for locking each cover to its coupling or connection of a flexible conveyer passing through said conduit to the shaft or to a point outside the mine, substantially as described.

5. The herein-described means comprising connected conduits leading from the various headings or drifts of a mine to the mine-shaft or point outside of the mine, couplings or connections interposed at various points throughout said conduits, the said couplings or connections having movable tops, and means for communicating from one coupling to another in the event of a cave-in between said couplings.

In testimony whereof I have signed this specification in the presence of two subscribing witnesses.

LOUIS WELKER.

Witnesses:
S. G. NOTTINGHAM,
S. W. FOSTER.